United States Patent
Zannier

(10) Patent No.: US 10,179,616 B2
(45) Date of Patent: Jan. 15, 2019

(54) FIXING SYSTEM FOR A SPARE WHEEL FOR A MOTOR VEHICLE

(71) Applicant: TRES SRL, Turin (IT)

(72) Inventor: Stefania Zannier, Correzzana (IT)

(73) Assignee: TRES S.r.l, Turin (IT)

( * ) Notice: Subject to any disclaimer, the term of this patent is extended or adjusted under 35 U.S.C. 154(b) by 174 days.

(21) Appl. No.: 15/102,723

(22) PCT Filed: Dec. 10, 2014

(86) PCT No.: PCT/EP2014/077141
§ 371 (c)(1),
(2) Date: Jun. 8, 2016

(87) PCT Pub. No.: WO2015/086647
PCT Pub. Date: Jun. 18, 2015

(65) Prior Publication Data
US 2016/0304140 A1    Oct. 20, 2016

(30) Foreign Application Priority Data
Dec. 10, 2013    (IT) ............................. MI2013A2050

(51) Int. Cl.
*B62D 43/04*    (2006.01)
*B62D 43/10*    (2006.01)

(52) U.S. Cl.
CPC ............. *B62D 43/04* (2013.01); *B62D 43/10* (2013.01)

(58) Field of Classification Search
CPC ...... B62D 43/04; B62D 43/10; B62D 43/007; B62D 43/02; B62D 43/06; B62D 43/08
See application file for complete search history.

(56) References Cited

U.S. PATENT DOCUMENTS 3,210,117 A * 10/1965 Hall ...................... B62D 43/04
                                                            224/538
3,389,924 A    11/1965 Bush et al.
(Continued)

OTHER PUBLICATIONS

International Search Report of PCT/EP2014/077141, dated Apr. 20, 2015. [PCT/ISA/210].
(Continued)

*Primary Examiner* — Derek Battisti
(74) *Attorney, Agent, or Firm* — Sughrue Mion, PLLC

(57) ABSTRACT

A fixing system for a spare wheel for a motor vehicle of the type is provided with a housing for said spare wheel, said fixing system comprising a first element with a first threaded end, which can be fixed to a bottom wall of said housing, also comprising a clamping nut and a metal fixing screw which comprises a threaded shaft and is coupled with said clamping nut in order to constrain said spare wheel inside said housing. Said first element comprises a central metal body with a second end provided with a threaded hole, and said first threaded end being screwed into said bottom wall of said housing, in order to block the position of said first element and to permanently fix the same to said housing, said threaded shaft of said fixing metal screw being screwed into said threaded hole of said second end of said central metal body, in order to make said fixing metal screw integral with said first element, furthermore said first element comprising an outer polymeric portion made of a polymeric material which envelops said central metal body.

11 Claims, 7 Drawing Sheets

(56) References Cited

U.S. PATENT DOCUMENTS

| | | | | |
|---|---|---|---|---|
| 4,111,344 | A * | 9/1978 | MacDonald | B62D 43/10 224/42.24 |
| 4,308,733 | A * | 1/1982 | Tampa | B62D 43/00 224/42.24 |
| 4,498,614 | A * | 2/1985 | Guarr | B60R 11/06 224/42.13 |
| 4,738,382 | A * | 4/1988 | Natori | B62D 43/10 224/42.12 |
| 5,639,196 | A * | 6/1997 | Murase | B62D 43/10 411/349 |
| 6,213,361 | B1 * | 4/2001 | Dexel | B62D 43/007 224/42.24 |
| 6,250,524 | B1 * | 6/2001 | Maruyama | B62D 43/10 224/42.13 |
| 7,708,175 | B2 * | 5/2010 | Edwards | B62D 43/10 224/42.14 |
| 2001/0041126 | A1 * | 11/2001 | Morin | B62D 43/00 414/463 |
| 2002/0185881 | A1 * | 12/2002 | Kosuge | B62D 43/10 296/37.2 |
| 2006/0017301 | A1 * | 1/2006 | Edwards | B62D 43/10 296/37.2 |
| 2006/0028042 | A1 | 2/2006 | Maeshima et al. | |
| 2006/0119125 | A1 * | 6/2006 | Muthigi | B62D 43/10 296/37.2 |

OTHER PUBLICATIONS

Written Opinion of PCT/EP2014/077141, dated Apr. 20, 2015. [PCT/ISA/237].

* cited by examiner

FIXING SYSTEM FOR A SPARE WHEEL FOR A MOTOR VEHICLE

CROSS REFERENCE TO RELATED APPLICATIONS

This application is a National Stage of International Application No. PCT/EP2014/077141 filed Dec. 10, 2014, claiming priority based on Italian Patent Application No. MI2013002050, filed Dec. 10, 2013, the contents of all of which are incorporated herein by reference in their entirety.

The present invention refers to a fixing system for a spare wheel for a motor vehicle.

In particular, the present invention refers to a positioning and fixing system for a spare wheel, internally with respect to a housing which is present in a motor vehicle, such as for example a car or similar vehicles.

The known fixing systems comprise a drawn metal element tapered bucket-shaped, which is usually welded in an inverted position to a bottom wall of said housing for said spare wheel.

Said metal element comprises a central threaded hole in which the first end of a metal screw is screwed, and it is also connected to a second end of a fixing ring nut, which in turn permits to fix in position said spare wheel.

During the manufacturing phase of said motor vehicle, in case it is necessary to produce gas-powered vehicles, the housing is used for introducing a gas tank.

A first disadvantage is that, in order to introduce a gas tank it is necessary to cut the first metal element, since it does not permit the introduction of the same and consequently this considerably complicates the production process, as it is necessary to cut a sheet with double thickness, in order to avoid a necessary cutting of a excessively big portion of sheet in said bottom wall of said housing.

The aim of the present invention is to realize a fixing system for a spare wheel for a motor vehicle, which is stable and even in case of a collision permits to maintain constrained said spare wheel without loosening it due to vibrations.

Another aim is to realize a fixing system for a spare wheel for a motor vehicle having a reduced weight and volume together with a high bending and traction resistance.

Another aim is to realize a fixing system of a spare wheel for a motor vehicle which permits to simplify the production process of vehicles with different powering systems, such as for example petrol or gas.

Still another aim is to provide a fixing system of a spare wheel for a motor vehicle which is simple and easy to realize and adaptable to different wheels with different widths.

Another aim is to provide a fixing system of a spare wheel for a motor vehicle which permits to avoid the cutting of sheets with double thickness in case it is necessary to install a gas tank instead of a spare wheel.

These aims according to the present invention are reached by realizing a fixing system for a spare wheel for a motor vehicle, as explained in claim 1.

Other features of the invention are highlighted in the following claims.

The features and advantages of a fixing system of a spare wheel for a motor vehicle according to the present invention will be more evident by the following exemplary and not limitative description, referring to the annexed schematic drawings, in which.

Figure 1:
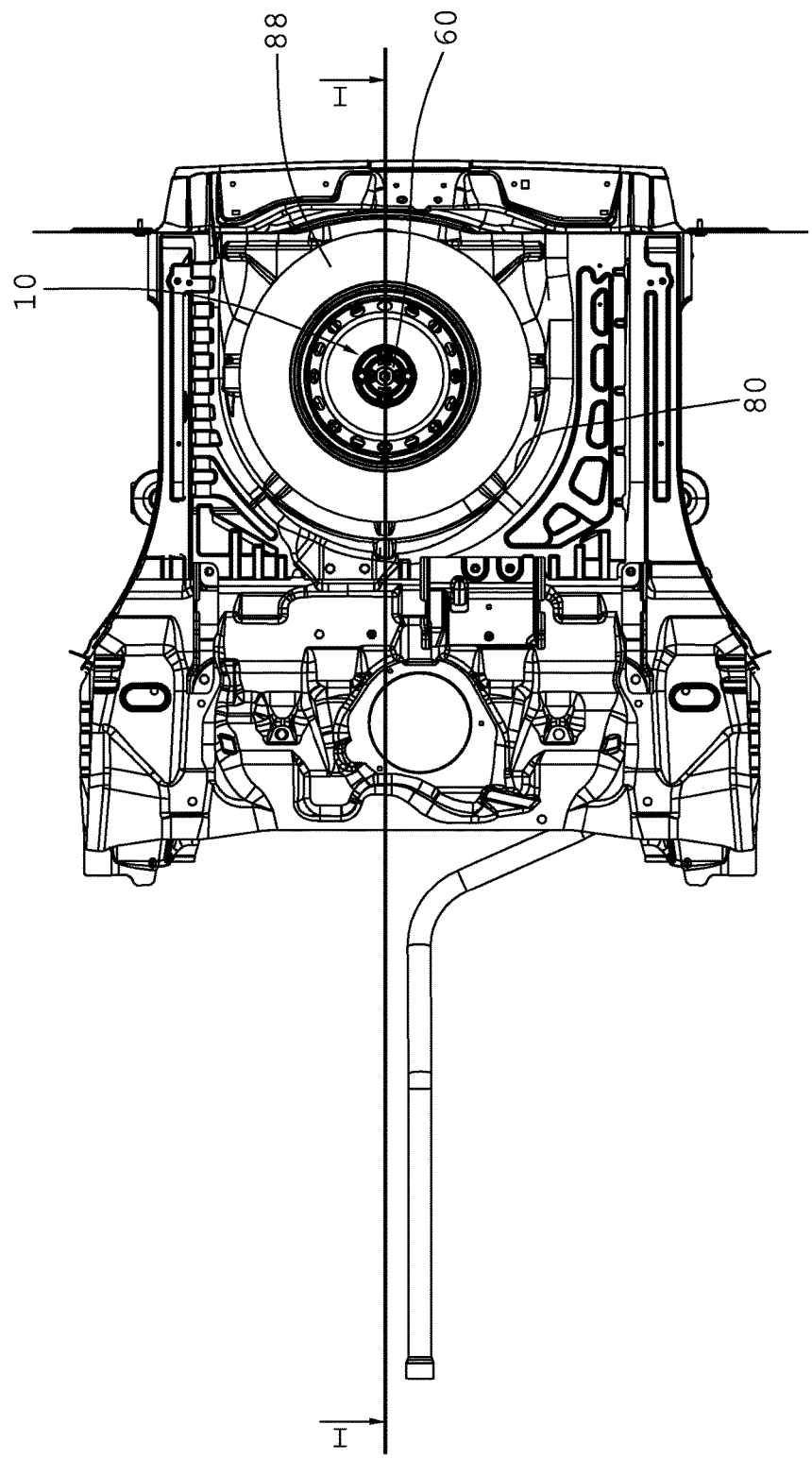
FIG. 1 is a top view of a rear portion of a motor vehicle in which a spare wheel is present, positioned inside a housing of the same, and in which the spare wheel is fixed to the housing through a preferred form of embodiment of a fixing system of a spare wheel for a motor vehicle according to the present invention.
Figure 2:
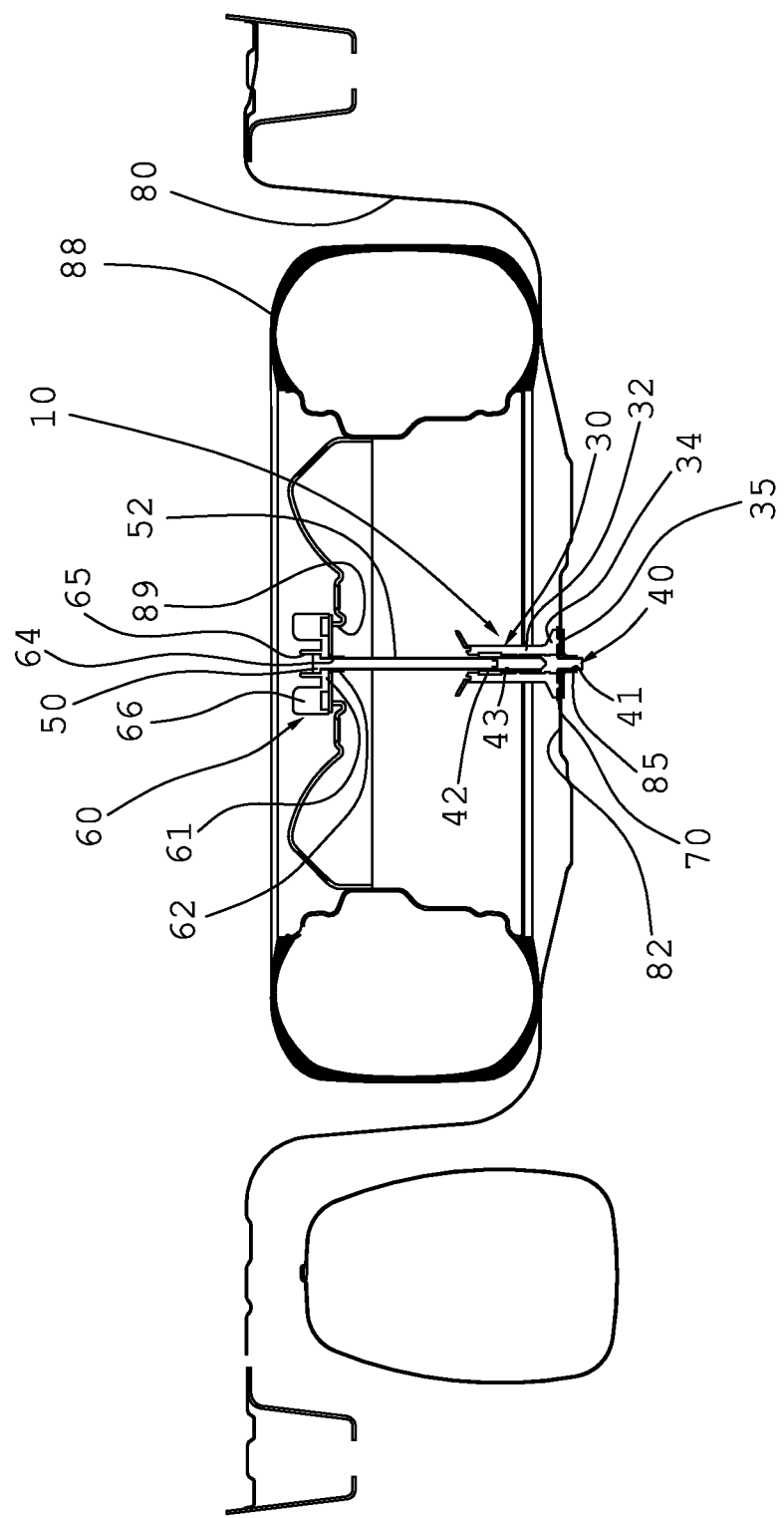
FIG. 2 is a left side elevation view of FIG. 1, sectioned along the I-I line.
Figure 3:
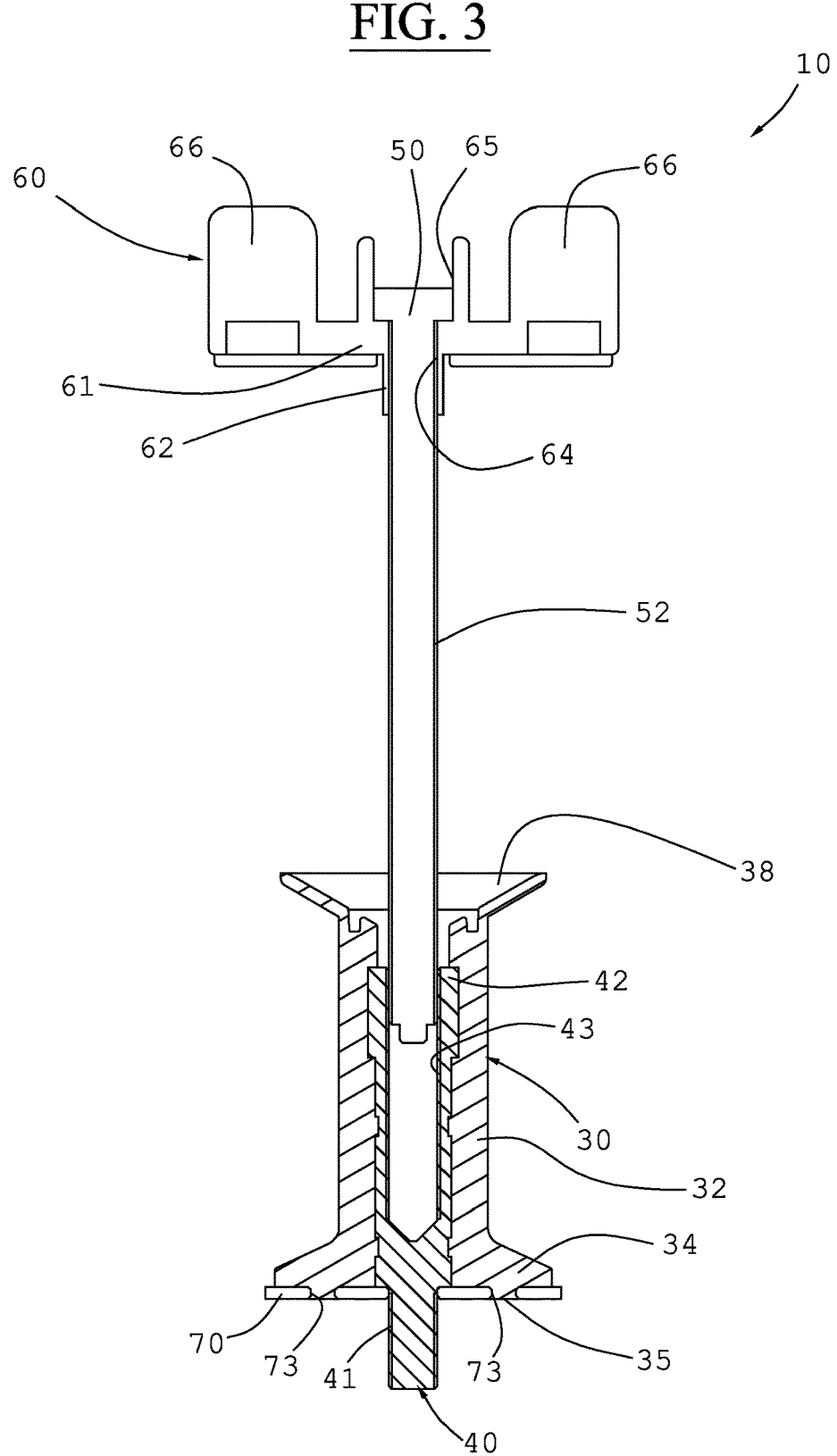
FIG. 3 is a partially sectioned front elevation view of a preferred form of embodiment of a fixing system of a spare wheel for a motor vehicle according to the present invention.
Figure 4:
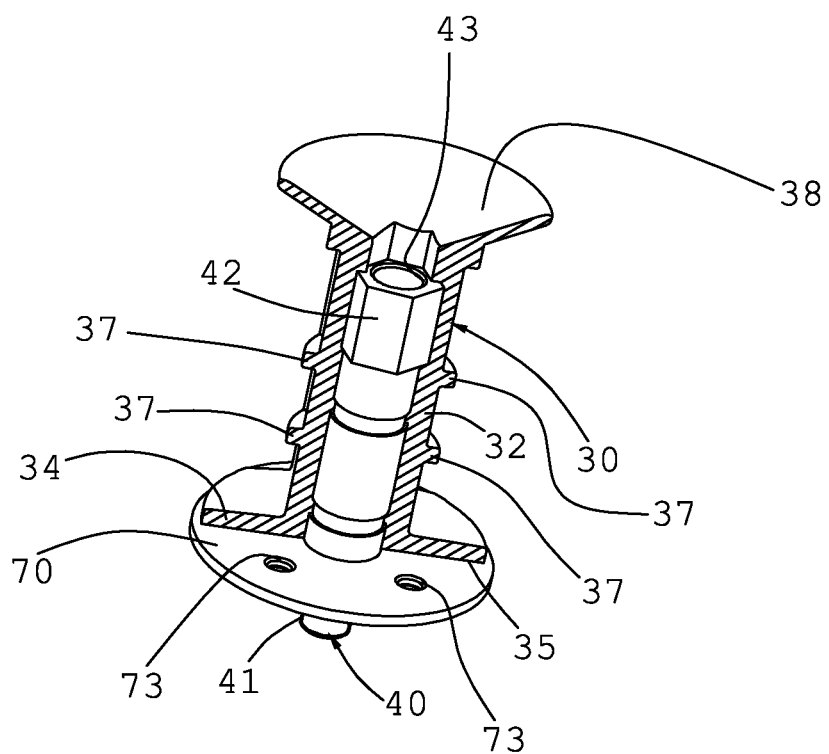
FIG. 4 is a perspective partially sectioned elevation top view of a preferred form of embodiment of a detail of FIG. 3 according to the present invention.
Figure 5:
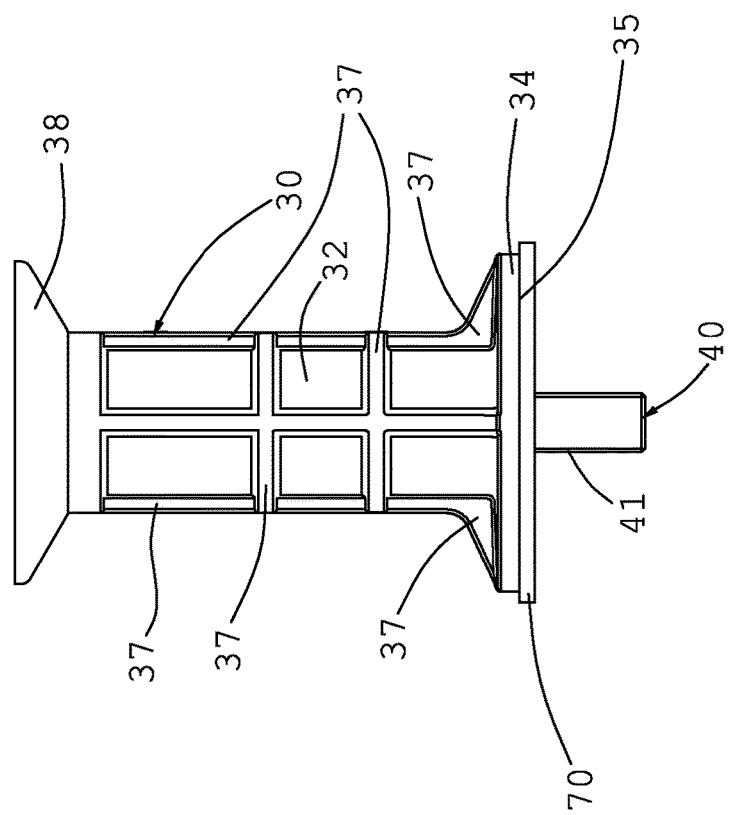
FIG. 5 is a front elevation view of a preferred form of embodiment of a detail of FIG. 3 according to the present invention.
Figure 6:
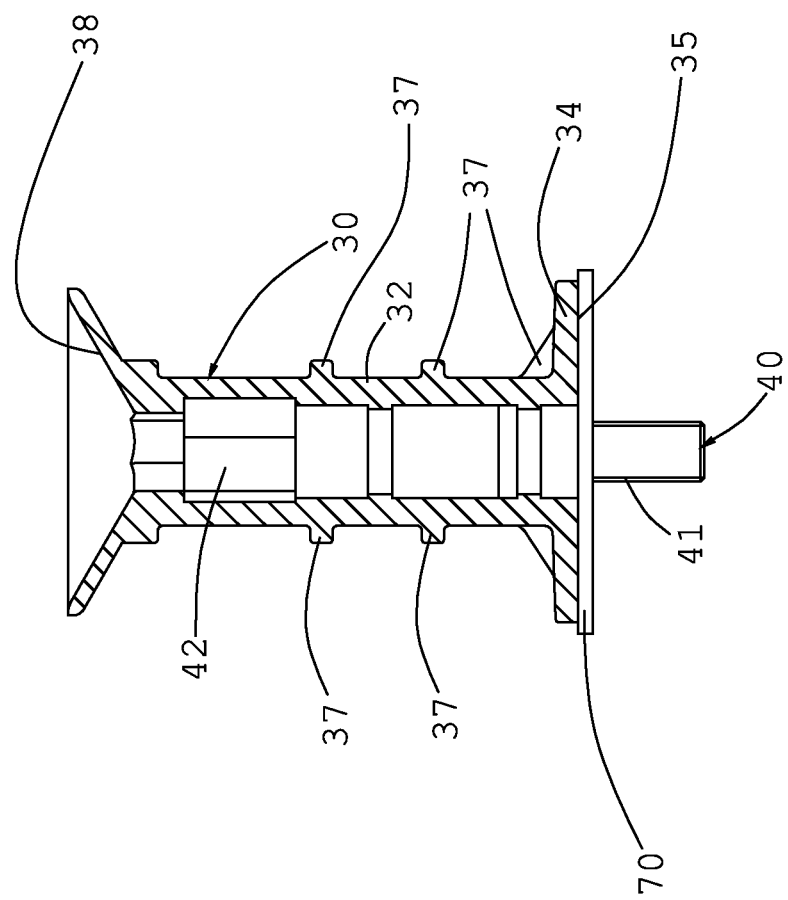
FIG. 6 is a partially sectioned front elevation view of the detail of FIG. 4.
Figure 7:
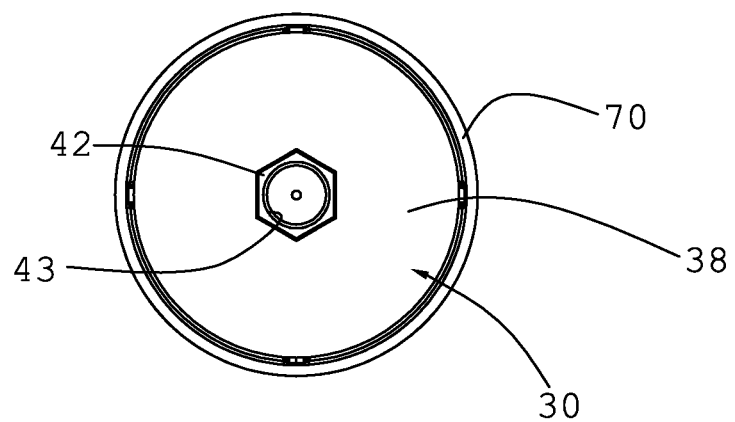
FIG. 7 is a top view of the detail of FIG. 6.

With reference to the figures, a fixing system 10 for a spare wheel 88 for a motor vehicle of the type provided with a housing 80 for said spare wheel 88 is shown, said fixing system 10 comprising a first element 30 comprising a first threaded end 41 which is fixable to a bottom wall 82 of said housing 80, said fixing system 10 also comprising a clamping nut 60 and a fixing metal screw 50 which comprises a threaded shaft 52 and it is coupled with said clamping nut 60 for constrain said spare wheel inside said housing 80.

According to the present invention, said first element 30 comprises a central metal body 40 having an elongated shape and also comprising said first threaded end 41 and a second end 42 provided with a threaded hole 43, said first threaded end 41 being screwed into said bottom wall 82 of said housing 80 for fix in its position said first element 30 and for block permanently the same to said housing 80, said threaded shaft 52 of said fixing metal screw 50 being screwed into said threaded hole 43 of said second end 42 of said central metal body 40 for make said fixing metal screw 50 integral with said first element 30, furthermore said first element 30 comprising an outer polymeric portion 32 made of a polymeric material which envelops said central metal body 40.

Advantageously, in this way said outer polymeric portion 32 permits to protect said central metal body 40 from corrosion and atmospheric agents and also permits to increase the bending strength of said first element 30, by maintaining at the same time a reduced overall weight, which consequently permits a reduction of the overall weight of the motor vehicle, with a reduction of the consumption of the same and of the polluting emissions associated to the same.

Advantageously, this permits to avoid sudden breaks in case of collision in a rear area of said motor vehicle, and it also permits to keep said spare wheel 88 in position, even during the deformation of said motor vehicle, and also permits to prevent an excessive deformation of an inner cabin of said motor vehicle, for a stiffening effect, determined by said spare wheel 88 when correctly placed, and determining a better safety for passengers.

Advantageously, this permits to use the same fixing system 10 with different models of spare wheel 88 and with different models of motor vehicles, so permitting a reduction in production costs.

In particular, said first element 30 is in particular fixable in a central position of said bottom wall 82, in order to vertically protrude into said housing 80, hence in such a way to vertically protrudes into said housing 80.

Advantageously, this permits to have a reference for a correct positioning and fixing of said spare wheel 88 into said housing 80.

Preferably said clamping nut 60 comprises a preferably tapered, axial-symmetric portion 62, which is insertable in a central hole 89 of said spare wheel 88, furthermore said clamping nut 60 comprises a disc-shaped central portion 61 which is connected to said axial-symmetric portion 62 and also said central portion 61 comprises a central through hole 64 having an upper end provided with a groove 65 preferably hexagonal, furthermore said clamping nut 60 comprises catching means 66 in particular made integral with said central portion 61 for permit the rotation of said clamping nut 60 so to screw said metal fixing screw 50 into said threaded hole 43 of said second end 42 of said central metal body 40, so permitting advantageously to have a fixing system very simple to use.

Preferably, said metal fixing screw 50 comprises a threaded shaft 52 which is insertable in said central through hole 64 of said clamping nut 60 and furthermore said metal fixing screw 50 comprises a head preferably hexagonal, which can be coupled to said groove 65 for permit the transmission of a rotary movement and of a clamping torque, furthermore said threaded shaft 52 being screwed into said threaded hole 43 of said second end 42 of said central metal body 40, such to permit the interconnection of said first element 30 with said clamping nut, for fix and constrain said spare wheel 88 inside said housing 80.

Advantageously, this permits to adapt the fixing system 10 to spare wheels with different widths, using the same components.

It is in fact possible to use a fixing metal screw 50 with different lengths for fix said spare wheels 88 having different widths and also by said clamping nut it is possible to constrain spare wheels 88 with different central holes.

Furthermore, preferably said outer portion 32 comprises a polymeric flange 34, made of a single piece integral with said outer portion 32, in particular by injection molding, said polymeric flange 34 extending perpendicularly to said central metal body 40 in proximity of said first threaded end 41 and which is set back with respect to said threaded end 41 for permit the clamping of the same to said housing, and said polymeric flange 34 also comprises a surface 35 which is in particular associated with said bottom wall 82 for stabilize said first element and keeping it clamped in the course of time, even in case of vibrations or collisions, avoiding an unscrewing of said first element from said bottom wall 88.

Advantageously, this permits to provide a great contact surface between said central metal body 40 and said outer polymeric portion 32, and also permits to transfer an high contact pressure from said central metal body 40 to said outer polymeric portion 32, in particular to said polymeric flange 34.

Advantageously, this permits to have an high compression of the polymeric flange 34 against said bottom wall 82 of said housing 80, avoiding that said central metal body 40 loses its engagement in the course of time from the same element to which it is screwed.

Preferably, said central metal body 40 having an elongated shape it has a decreasing section from said second end 42 towards to said first threaded end 41 and it has in particular an outer lateral surface provided with a plurality of radial grooves and preferably provided with a threaded portion.

Advantageously, this permits to obtain the transmission of a compression stress from said central metal body 40 to said outer polymeric portion 32 and in particular to said polymeric flange 34, so permitting a stable fixing in the course of time of said spare wheel inside said housing 80, and avoiding a loosening of the same in the course of time, due to vibrations present during the use of said motor vehicle.

In particular, said central metal body 40 having with an elongated shape it has a substantially decreasing section from said second end 42 to said first threaded end 41, in particular in a discontinuous way.

Advantageously, this permits to have a great contact surface between said central metal body 40 and said outer polymeric portion 32 permitting the transmission of a clamping torque without affecting the disengagement of the same.

Preferably, said second end 42 of said central metal body 40 has a polygonal section, in particular an hexagonal section, for avoid relative movements between said central metal body 40 and said outer polymeric portion 32 hence permitting to transmit a clamping torque without affecting the disengagement of the same.

Preferably, said threaded hole 43 of said second end 42 is coaxial with said first threaded end 41 of said metal body 40.

This permits to advantageously have a structural continuity between said central metal body 40 and said metal fixing screw 50.

Preferably said first threaded end 41 is screwed in said through hole made realized inside said bottom wall 82 of said housing 80 for block in its position said first element 30.

In particular, said outer polymeric portion 32 comprises at least one metal insert 70, such as in particular at least one metal disc 70, which is inserted in said first threaded end 41 and at the same time which is partially dipped into an outer base wall 35 of said polymeric flange 34, in order to stiffen the same and advantageously permit a greater friction of said outer polymeric portion 32 and said bottom wall 82 of said housing 80.

Advantageously this permits to have a first element 30 which is cheap and easy to realize, together with a reduced weight and encumbrance.

In particular, said polymeric flange 34 has a reduced outer diameter in particular smaller than 50 mm and this also permits to have a greater stiffness and stability of said first element 30, by avoiding an offset of the same with respect to a axial direction perpendicular to said bottom wall 82.

Preferably, said outer polymeric portion 32 comprises a plurality of polymeric ribs 37, which permit to stiffen considerably said first element 30 by keeping a reduced weight at the same time, and so advantageously permitting a reduction of the total weight of said fixing system 10.

Preferably said metal disc 70 comprises at least one central through hole 43 for inserting of said first threaded end 41 of said metal body 40 and a plurality of tapered through holes 73 positioned around said central through hole, advantageously in order to make integral said at least one metal insert with said outer polymeric portion 32 and in particular with said polymeric flange 34 by injection molding.

Preferably, said outer polymeric surface 32 also comprises an axial-symmetric portion 38 with a substantially V-shaped cross section which extends radially in proximity of said second end 42 of said central metal body 40 for advantageously facilitate the insertion and screwing of said fixing screw 50 in said threaded hole 43.

According to another aspect of the present invention, a motor vehicle is provided, comprising an housing 80 for said spare wheel 88 and it also comprises a fixing system 10 for a spare wheel 88, according to any form of embodiment previously described.

In particular, said motor vehicle comprises a platform preferably polymeric which is interposed between said clamping nut 60 and said spare wheel 88 and it also preferably comprises a kit of tools for change a wheel of a motor vehicle.

Preferably, said spare wheel 88 comprises a central hole 89 for fixing it to a hub of an axis of said motor vehicle and furthermore said motor vehicle comprises said spare wheel 88.

Preferably, said motor vehicle comprises an axial-symmetric metal flange 85 provided with a threaded central hole which is welded in a central position of said bottom wall 82 of said housing 80 in correspondence of said through hole realized in said bottom wall 82, said first threaded end 41 of said central metal body 40 being screwed in said central threaded hole for block in its position said first element 30.

Advantageously, during the manufacturing process of said motor vehicle, this permits to cut a relatively small sheet portion of said bottom wall 82 and first of all it also permits to avoid to cut a sheet portion with a double thickness, which could be much more difficult to cut with traditional machines, available in a production line.

Advantageously, in this way it is possible to use the same motor car even in case it is necessary to install a gas tank, such to permit to avoid to modify considerably the production process of said motor vehicle, in case it is necessary to obtain a motor vehicle with gas feeding instead of petrol, simply by partially differencing a portion of the production process.

It is so clear that a fixing system for a spare wheel for a motor vehicle according to the present invention fulfills the previously highlighted aims.

The fixing system for a spare wheel for a motor vehicle of the present invention so conceived can be subjected to various changes and variants, all within the same inventive concept.

Furthermore, in practice the used materials and also their sizes and components could be of any kind, according to the technical needs.

The invention claimed is:

1. A fixing system for a spare wheel for a motor vehicle of the type provided with a housing for said spare wheel, said fixing system comprising a first element with a first threaded end which is fixable to a bottom wall of said housing, said first element being in particular fixed in a central position of said bottom wall in order to vertically protrude into said housing, said fixing system also comprising a clamping nut and a fixing metal screw which comprises a threaded shaft and it is coupled with said clamping nut for constraining said spare wheel inside said housing, wherein said first element comprises a central metal body having an elongated shape and also comprising said first threaded end and a second end provided with a threaded hole, said first threaded end being screwed into said bottom wall of said housing for fixing permanently the first element to said housing, said threaded shaft of said fixing metal screw being screwed into said threaded hole of said second end of said central metal body for making said fixing metal screw integral with said first element, furthermore said first element comprising a polymeric outer portion made of a polymeric material which envelops said central metal body, wherein said outer portion comprises a polymeric flange realized in a single piece integrally with said outer portion, in particular through injection molding, said polymeric flange extending perpendicular to said central metal body in proximity of said first threaded end and which is set back from said first threaded end for permit the clamping of the same in said housing, furthermore said polymeric flange comprises a surface which is in particular associated with said bottom wall for stabilize said first element and keep the same blocked in the course of time, even in case of vibrations or collisions, avoiding an unscrewing said first element from said base wall, wherein said outer polymeric portion at least comprises a metal insert as in particular at least one metal disc which is inserted in said first threaded end and at the same time is partially dipped into an outer base wall of said polymeric flange, in order to stiffen the same and to advantageously permit a greater friction between said outer polymeric portion and said bottom wall of said housing.

2. The fixing system according to claim 1, wherein said clamping nut comprises an axial-symmetric portion preferably tapered, which is insertable in a central hole of said spare wheel, furthermore said clamping nut comprises a disc-shaped central portion which is connected to said axial-symmetric portion and furthermore said central portion comprises a central through hole having an upper end provided with a groove preferably hexagonal, furthermore said clamping nut comprises catching means made in particular integral with said central portion.

3. The fixing system according to claim 1, wherein said fixing metal screw comprises a threaded shaft which is insertable into said central through hole of said clamping nut and furthermore said fixing metal screw comprises a head preferably hexagonal which can be coupled with said groove for permitting the transmission of a rotary movement and of a clamping torque, furthermore said threaded shaft being screwed in said threaded hole of said second end of said central metal body in such a way to permit the interconnection of said first element with said clamping nut and for fix and constrain said spare wheel in said housing.

4. The fixing system according to claim 1, wherein said first element is fixable in a central position of said bottom wall in order to vertically protrude into said housing.

5. The fixing system 10 according to claim 1, wherein said central metal body having an elongated shape it has a decreasing section from said second end towards said first threaded end and furthermore it has in particular an outer lateral surface provided with a plurality of radial grooves and preferably provided with a threaded portion.

6. The fixing system according to claim 5, wherein said central metal body has an elongated shape and it has a substantially decreasing section from said second end to said first threaded end in particular in a discontinuous way.

7. The fixing system according to claim 1, wherein said polymeric flange has a reduced outer diameter, in particular lower than 50 mm and also this permits a greater stiffness and stability of said first element, by avoiding an offset of the same with respect to an axial direction perpendicular to said bottom wall.

8. The fixing system according to claim 1, wherein said at least one metal disc comprises a central through hole for inserting said first threaded end of said central metal body and also comprises a plurality of tapered through holes positioned around said central through hole, advantageously for make said at least one metal insert integral with said first outer polymeric portion and in particular with said polymeric flange by injection molding.

9. A motor vehicle, comprising a housing for said spare wheel and also comprising a fixing system for said spare wheel according to claim 1.

10. The motor vehicle according to claim 9, wherein said spare wheel comprises a central hole for being fixed to a hub of an axle of said motor vehicle and in that said motor vehicle comprises said spare wheel.

11. The motor vehicle according to claim 9, further comprising a metal asymmetric flange provided with a central threaded hole which is welded to a central position of said bottom wall of said housing in correspondence of a through hole realized in said bottom wall, said first threaded end of said central metal body being screwed into said central threaded hole to fix in position said first element.

* * * * *